UNITED STATES PATENT OFFICE.

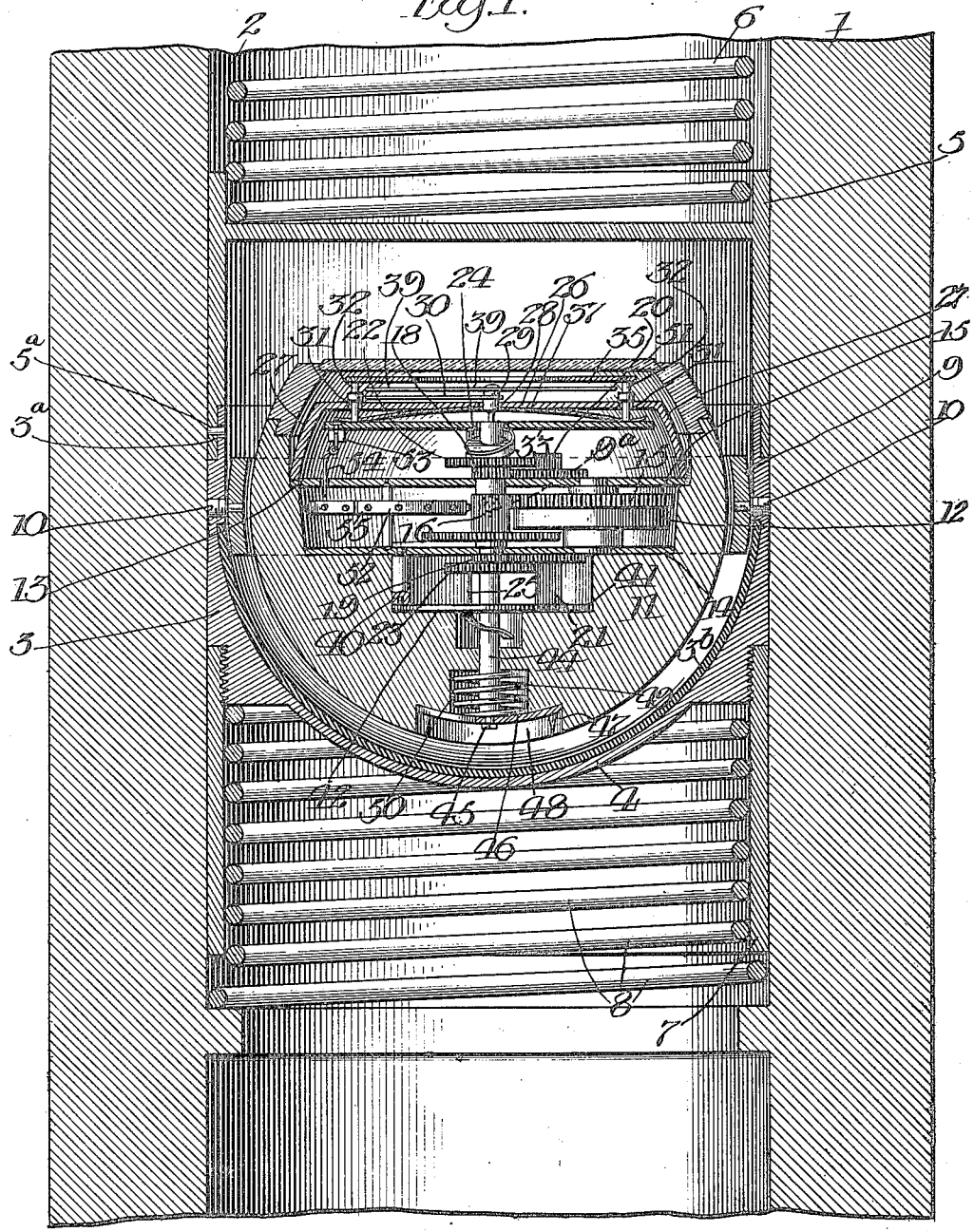

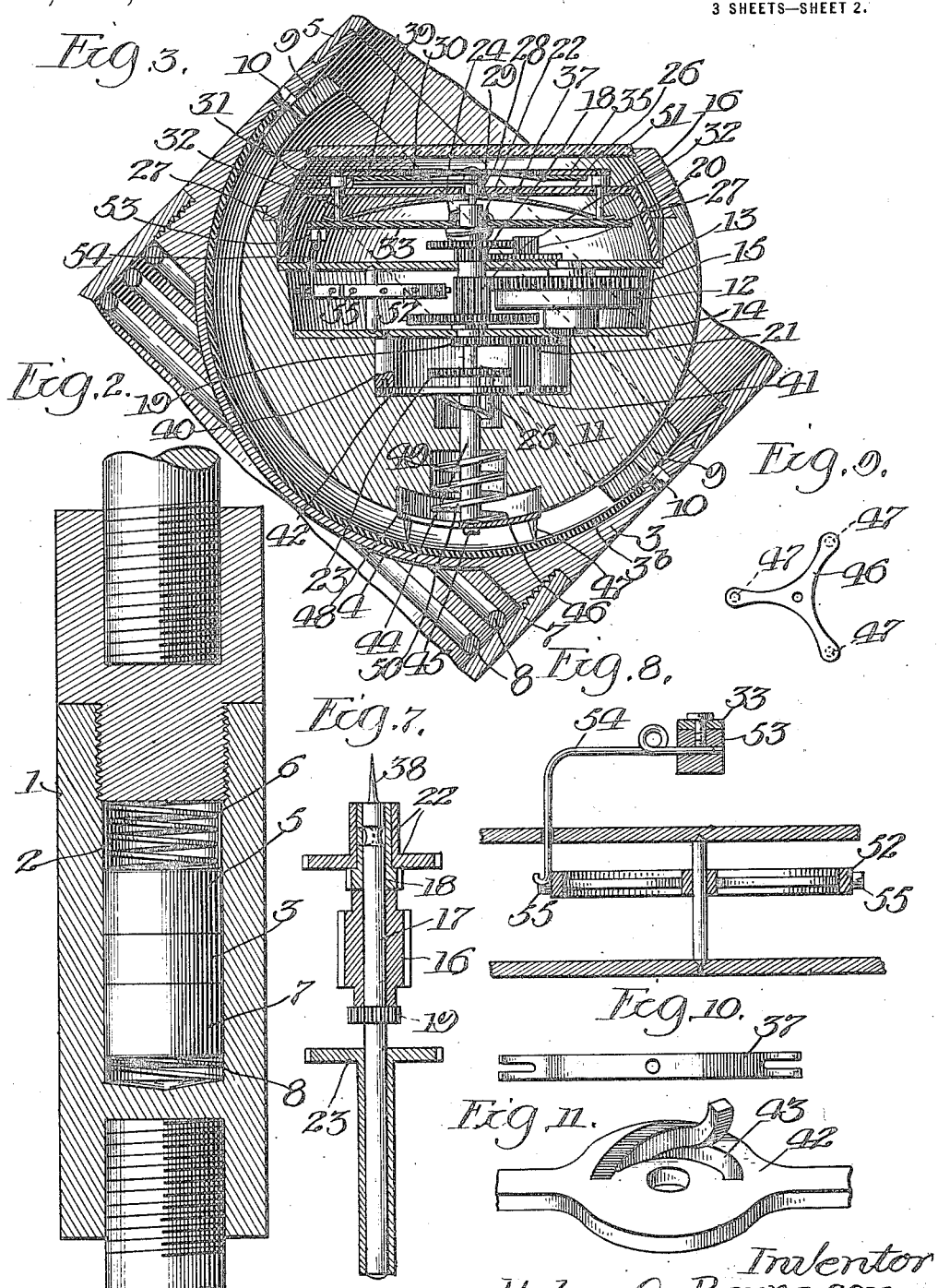

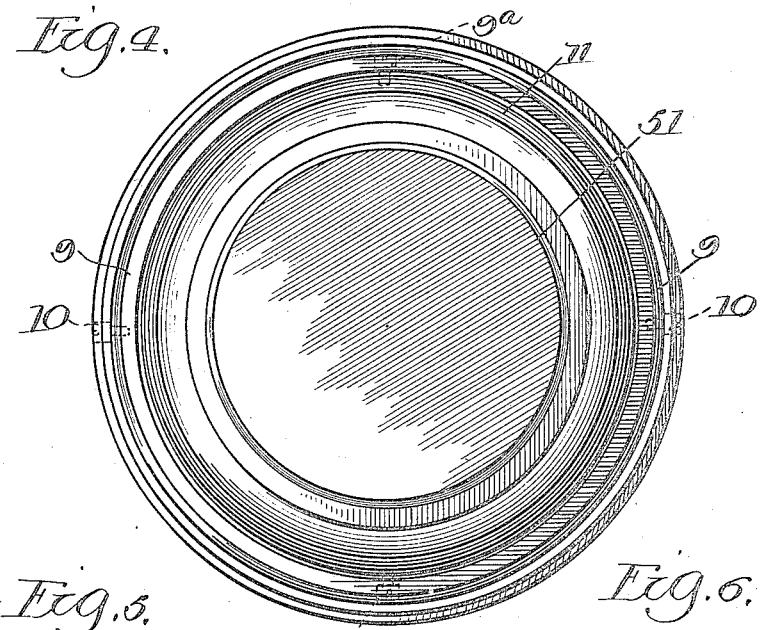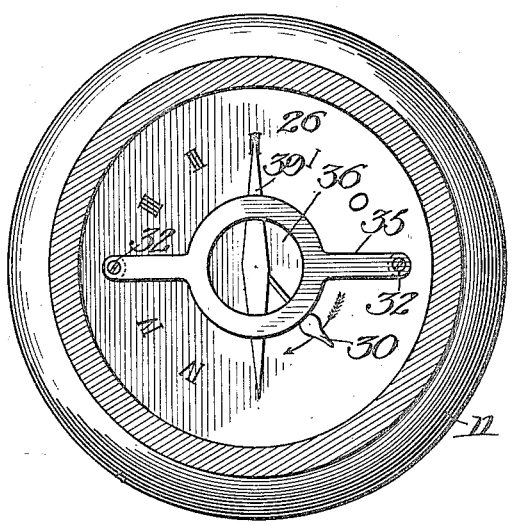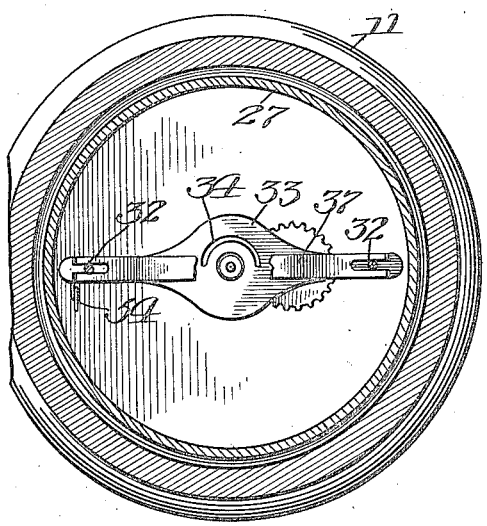

HELGE A. BORRESEN, OF MARQUETTE, MICHIGAN.

DEVICE FOR ASCERTAINING THE VERTICAL ANGLE AND DIRECTION OF DIAMOND-DRILL HOLES.

1,152,701.  Specification of Letters Patent.  Patented Sept. 7, 1915.

Application filed November 4, 1908. Serial No. 461,016.

*To all whom it may concern:*

Be it known that I, HELGE A. BORRESEN, a citizen of the United States, residing at the city of Marquette, in the county of Marquette and State of Michigan, have invented a new and useful Device for Ascertaining the Vertical Angle and Direction of Diamond-Drill Holes.

It is known that in prospecting for mineral deposits, it is usual to bore into the ground a hole, with a diamond drill, which not only provides the hole, but cuts a core of the material into which it is introduced, which core can be broken off and subsequently examined to ascertain the nature of the material under investigation. It is also known that in drilling as above described, the drill is often forced from the vertical in a direction, and at an angle which cannot be ascertained from the surface of the earth.

My invention relates to the provision of facilities for ascertaining both the vertical angle and direction, of such diamond drill holes. It is also possible with my instrument to attach it immediately above the appliance for breaking off and removing the core heretofore referred to, and by so doing, the lay or direction or angle of the stratification or formation of the core can also be accurately ascertained.

To effectuate the above results, I have provided the mechanism shown in the accompanying drawings, in which—

Figure 1 is a view, partially in section, of my invention, inclosed in the chamber of the drill rod. Fig. 2 is a section of the chambered drill rod, showing my invention therein. Fig. 3 is a view, partially in section, showing my invention after the locking mechanism has operated in an inclined or slanting drill hole. Fig. 4 is a plan of my invention with the cover removed, showing the gimbal arrangement. Fig. 5 is a plan of my invention taken below the crystal, showing the dial, hour hand, compass, and compass locking ring. Fig. 6 is a plan of my invention taken below the dial, showing the plate 33 and spring, 37. Fig. 7 is a detail elevation, partially in section, of the center arbor construction. Fig. 8 is a vertical detail, partially in section, of the means for locking the timing mechanism. Fig. 9 is a detail of the three-armed plate, 46. Fig. 10 is a detail plan of the spring, 37. Fig. 11 is a perspective detail of the bottom of the plate, 42.

The shaft for operating the diamond drill is made up of sections of suitable length, which are screwed into one another to lengthen the rod as the hole is produced. The numeral 1 designates such a section, having provided therein the chamber 2, in which the mechanism hereinafter described is to be inserted to lower it into the hole. This section I prefer to make of brass, or other non-magnetic metal, so as to do away with such magnetic influences as may be created in the rod itself. It is also well to have brass sections extending for some distance on each end of the section containing the chamber 2, in order to further escape magnetic influences.

The numeral 3 designates a thin casing, the inner face of the bottom, 4, of which, is given a spherical form. The casing, 3, is provided with a top, 5, having upon the top thereof a coiled spring, 6. The top, 5, is secured to the casing, 3, by means of the pins, 5ª, and the L slots, 3ª. To the lower portion of the casing, 3, is attached a cylindrical projection, 7, into which extends a coiled spring, 8. The coiled springs, 6 and 8, are for the purpose of cushioning my device in the chamber, 2, so that sudden jars will not cause damage to it. It will further be observed that the lower coils of the coiled spring, 8, are of larger diameter than the upper coils thereof, so that the coiled spring, 8, will be held by friction in the bottom of the chamber, 2, and when the device is inserted in said chamber, the cylindrical projection, 7, will surround the upper reduced coils of said coiled spring, 8.

In the cylindrical portion of the casing, 3, I suspend the gimbal band, 9, upon the pivot screws, 10, and at right angles to the pivots, 10, I suspend within the gimbal pivots, 10, I suspend within the gimbal band, 9, upon the pivots, 9ª, a semi-spherical casing, 11, the bottom portion of which is weighted, so that no matter what direction the chamber, 2, and casing, 3, may be made to take, by reason of the direction of the hole, the casing, 11, will always remain vertical, by reason of gravity. I provide within this casing, 11, a compass, and clock mechanism, provided with facilities for fixing or locking the compass and also the casing, 11, with reference to the outer casing, 3, at any pre-determined time, so that after having set the clock mechanism for operating the stopping, locking or fixing mechanism at a certain time, the device can be lowered into the diamond drill hole and left there until the expiration of the time, when upon drawing it up, the angle of the casing, 3, and the casing, 11, will show the vertical angle of that portion of the hole in which the device rested at the pre-determined time, and the angle of the compass needle with the axis of the casing, 3, will also show the direction of the diamond drill hole at the same place.

I shall now proceed to describe the arrangement of the compass, the means for fixing or locking it and the casings, 3, and 11, and the manner in which these mechanisms are operated by the clock mechanism.

Having special reference to Fig. 1, the numeral 12 designates a suitable form of main-spring barrel in a watch or clock mechanism. This is disposed between plates, 13 and 14, and transmits motion by means of the gear, 15; integral with said main-spring barrel, 12, to the central pinion, 16, which is mounted upon the central arbor, 17, clearly shown in Fig. 7, which extends a suitable distance above and below the plates, 13 and 14. Over the upper end of this central arbor, 17, which extends above the plate, 13, is placed the cannon pinion, 18. The cannon pinion, 19, is made integral with the lower end of the central arbor, 17, and comes just below the plate, 14. At the sides of these cannon pinions are located the intermediate gears, 20 and 21, which mesh with and drive the hour-wheels, 22 and 23. These hour-wheels revolve freely upon the cannon pinions.

Upon the outer face of the hour wheel, 22, is mounted a piece having the spiral projection or cam, 24. Projecting outwardly or downwardly from the hour wheel, 23, is the lug, 25.

Supported upon the plate, 13, in any suitable manner, (in Fig. 1 the construction is shown supported by the dome sides, 27), is the dial-plate, 26, through the central aperture, 28, in which, projects the hour-hand arbor, 29, rising from the hour-wheel, 22. Upon this arbor is mounted the hour-hand, 30, to revolve above the face of the dial. Through the dial, 26, and near the edges thereof, are further provided the apertures, 31, through which extend the pillars, 32. The bottoms of the pillars, 32, are connected by means of the plate, 33. This plate, 33, has provided therein, as clearly shown in Fig. 6, the arc-shaped, concentric slot, 34, which registers with a portion of the path of the spiral cam, 24, for a purpose to be hereafter described. The tops of the pillars, 32, are connected by means of the plate, 35, having the comparatively large central opening, 36, therein, clearly shown in Fig. 5. Between the dial, 26, and the plate, 33, is interposed the curved spring, 37, a plane view of which is shown in Fig. 10.

Mounted in the upper end of the central arbor, 17, is the pin, 38, upon the end of which and between the plate, 35, and the dial, 26, is mounted a compass needle, 39, of such a length as to swing freely between the pillars, 32.

The dial, 26, is numbered half-way around, from left to right, in the reverse of the order of an ordinary watch or clock. Of course the numbering may be continued farther around the dial if it be found desirable.

It will now be perceived that when the highest end of the spiral projection or cam, 24, passes the left end of the arc-shaped slot, 34, in the plate, 33, the spring, 37, will depress the plate, 33, which, through the pillars, 32, will also carry down the plate, 35, thereby securing, locking and holding from further oscillation the compass needle, 39.

Extending downwardly or outwardly from the plate, 14, are the pillars, 40, and 41, on the outer ends of which is mounted the plate, 42, which is provided with an arc-shaped concentric slot, 43, similar in all respects to the slot, 34, in the plate, 33, except that the metal forming said slot is not detached, but is bent from one end of said slot to form a downwardly extending spiral path upon which the projection, 25, is returned to the upper side of the plate, 42, by the continued movement of the timing mechanism. This slot, 43, registers with the projection or cam, 25, and also with the slot, 34. The pillar, 41, is conveniently made in screw form, to hold the intermediate gear, 21, the outer portion or pinion of which, which actuates the hour-wheel, 23, is made sufficiently long to extend between the intermediate gear, 21, proper, and the plate, 42.

Extending downwardly from the hour-wheel, 23, is the arbor, 44, to the outer end of which is attached, by means of screw, 45, the three-armed plate, 46. On the outer ends of each of the three arms of this plate, 46, are the projections or points, 47. The screw, 45, holds the plate, 46, loosely, so that there is play to both revolve and to rock or oscillate, for a purpose hereinafter to be described.

The casing, 11, is further provided with the cut-out portions, or recesses, 48 and 49. The recess or cut-out portion of 48 is for the purpose of completely housing the plate, 46, and the projections, 47, and the cut-out portion or recess of 49 is for the purpose of housing the coiled spring, 50, the upper end of which rests against the upper or inner wall of the cut-out portion, 49, and the lower end of which rests against and tends to impel outward the three-armed plate, 46. It will now be perceived that at the same time at which the spiral cam, 24, operates to permit the locking of the compass needle, as heretofore described, the projection, 25, will pass entirely into the slot, 43, and permit the spring, 50, to force the three-armed plate, 46, outwardly.

I line the inner face of the casing, 3, with soft rubber, or other suitable friction material, (3ᵇ), so that when the plate, 46, is forced outwardly, the projections, 47, will easily catch therein and maintain the casing, 11, and the casing, 3, in the relative positions they occupy when the plate 46 is forced outwardly.

It will now be seen that the reason for attaching the three-armed plate loosely is to permit it to shift so that it can get a better contact with the rubber lining, 3ᵇ, of the casing, 3.

I have provided in the top of the casing, 11, the cover-crystal, 51, to prevent the entrance of dust and dirt.

Inasmuch as it may take a considerable time to withdraw the mechanism from the diamond drill-hole, in which the natural operation of the watch mechanism through the spiral cams would release the compass needle and the plate, 46, I have provided the following mechanism to stop the operation of the watch at the same time that the cams operate to fix or lock the compass needle and relative positions of the casings, 3 and 11: I have omitted from the drawings the train of wheels and lever employed in operating the balance wheel, as they are in no sense different from those usually employed. The balance wheel, however, is shown and indicated by the numeral, 52, in the ordinary relative position which it usually occupies in a watch mechanism. To the under side of the plate, 33, I have secured a lug, 53, in which is mounted a light wire spring, 54, the lower end of which extends just above and outside of the periphery of the balance wheel, 52. When the plate, 33, is forced downwardly by means of the spring, 37, as heretofore described, the spring, 54, is projected downwardly between the balance screws, 55, usually carried by such a balance wheel, thereby locking the watch mechanism and preventing its further movement from destroying the fixation of the compass needle, and the relative position of the casings, 3 and 11.

It will now be perceived that no matter what angle, or direction, the outer casing, 3, may be made to assume by reason of its confinement in the chamber, 2, the casing, 11, will always remain level, through the action of its gimbal bearings.

The adjustment of this device is secured by rotating the clock mechanism to the point where the spiral cam, 24, and projection, 25, permit the operation of the setting or fixing mechanism. The hour-hand is then set upon the dial at zero. It will now be perceived that if the mechanism is revolved to a position where the hour-hand will point to say, two, it will be just two hours before it will again reach zero, when the cam 24 and projection 25 will again operate the stopping or fixing mechanism. I have indicated the proper direction for setting the mechanism by an arrow upon the face of the dial. It is or will of course be obvious that the spiral cam, 24, and projection, 25, will permit the mechanism to be turned in only one direction. The clock mechanism having been set for a pre-determined time, the device is inclosed in the chamber, 2, and lowered into the diamond drill hole, and there permitted to remain until after the pre-determined time has expired, when it is again drawn to the surface. It will then be found from the relation of the casings, 3 and 11, at what vertical angle the hole extends, at the depth at which the test was made, and the angular relation of the fixed compass needle to the axis of the instrument will give the compass direction of the hole at the same point.

Having described my invention, what I claim as new, and desire to secure by Letters Patent, is:—

1. A casing, another casing mounted within said first-mentioned casing upon gimbals, spring-actuated means for locking said casings at the various angles that they may assume with respect to each other, and timing mechanism for causing said locking mechanism to operate at a pre-determined time.

2. An outer casing, a casing swung upon gimbals within said outer casing, a compass needle mounted in said inner casing, means for locking said compass needle against further oscillation, means for locking said casings at the angle they may assume to each other, and timing mechanism for causing said locking mechanism to operate at a pre-determined time.

3. An outer casing, a gimbal mounted inner casing, a compass needle within said inner casing, means for locking said compass needle against further oscillation, means for locking said casings against further relative motion, timing means for causing said locking means to operate at a pre-determined time, and means for stopping said timing mechanism at the time it causes the action of said locking mechanism.

4. In a vertical angle and direction register, a timing mechanism and locking mechanism to be operated thereby, comprising a spring-actuated member having a segmental slot therein, a lug carried by said timing mechanism in the path of said slot adapted to permit the movement of said spring-actuated member when said lug comes in vertical alinement with said slot.

5. In a vertical angle and direction register, a timing mechanism and locking mechanism to be operated thereby, comprising a spring-actuated member, a plate having a circular slot therein, a projection carried by said timing mechanism in the line of said slot, adapted to permit the motion of said spring-actuated member when said projection and said slot come in vertical alinement, and spiral means for returning said projection out of said slot by the further rotation of said timing mechanism.

6. In a machine, means for causing the operation thereof at a pre-determined time, comprising a timing mechanism, a projection rotated thereby, a plate having a slot therein which registers with a portion of the path of said projection, and spring-operated means to cause said projection to enter said slot when the same are brought into coincidence by the operation of said timing mechanism.

7. In a machine, means for causing the operation thereof at a pre-determined time, comprising a timing mechanism, a projection rotated thereby, a plate having a slot therein which registers with a portion of the path of said projection, spring-actuated means for causing said projection to enter said slot when the same are brought into coincidence by the operation of said timing mechanism and a spiral incline for causing said projection to withdraw from said slot.

8. In a vertical angle and direction register, comprising an outer casing, a gimbal-mounted inner casing, means for fixing the respective casings against further relative motion, comprising a plunger carried by said inner casing having a three-armed loose outer end thereon, and means for causing said plunger to force said loose end against said outer casing.

9. In a vertical angle and direction register, comprising an outer casing, a gimbal-mounted inner casing, means for fixing the respective casings against further relative motion, comprising a plunger carried by said inner casing, and means for forcing the outer end of said plunger against said outer casing.

10. A casing, a second casing, means for mechanically universally mounting said second casing within the first casing, compass mechanism provided in said second casing, locking mechanism provided in the second casing for locking the compass mechanism, locking mechanism for locking said casings together, and timing mechanism within the second casing for controlling the operation of said locking mechanisms.

11. A device of the character described having a compass provided with a magnetic needle, means for universally mounting said compass, means for locking the needle and the compass, and clock mechanism for controlling the locking means for said compass in any given position and also the locking of needle thereof in any given position at any predetermined time.

12. A watch mechanism of the character described having time controlled locking devices, a center wheel, a central arbor extending beyond either side of the center wheel, said arbor being of a length to accommodate said time controlled locking devices at either side of said center wheel, and a universally mounted compass adapted to be locked in any position by said locking devices and having a needle controlled by said locking devices.

13. A watch mechanism of the character described having time controlled locking devices, a center wheel, a central arbor extending beyond both sides of the center wheel, said arbor being of a length to accommodate said time controlled locking devices at both sides of said center wheel, and a universally mounted compass adapted to be locked in any position by said locking devices and having a needle controlled by said locking devices.

14. A watch mechanism of the character described having time controlled locking devices, a center wheel, a central arbor extending beyond both sides of the center wheel, said arbor being of a length to accommodate said time controlled locking devices at both sides of said center wheel, a universally mounted compass adapted to be locked in any position by said locking devices and having a needle controlled by said locking devices, and means to periodically operate said time controlled locking devices.

15. A compass needle operatively associated with the center arbor of a watch mechanism or movement, means for universally mounting said watch mechanism or movement, one end of said center arbor operating in combination with means for locking said compass needle at a predetermined time.

16. A watch movement or mechanism having a center arbor in combination with means for universally mounting said movement or mechanism, and means for stopping the universal action of said mounting, said watch movement having one end of its center arbor operating in combination with said stopping means.

17. In combination a compass needle, a watch movement having a center arbor, means for universally mounting said watch movement, means for locking said needle, and means for locking said universal mounting, said compass needle being operatively associated with one end of said center arbor, one end of said center arbor inter-acting with the means for locking said needle and the other end of said center arbor interacting with said means for locking the universal mounting so as to lock the same against movement at any predetermined time.

In testimony whereof, I have hereunto set my hand in the presence of two witnesses.

HELGE A. BORRESEN.

Witnesses:
BENJ. T. ROODHOUSE,
S. G. GRODSON.